(12) United States Patent
Hasegawa et al.

(10) Patent No.: US 11,815,595 B2
(45) Date of Patent: Nov. 14, 2023

(54) VEHICLE SENSOR MOUNTING STRUCTURE AND VEHICLE SENSOR BRACKET SET

(71) Applicant: TOYOTA JIDOSHA KABUSHIKI KAISHA, Aichi-ken (JP)

(72) Inventors: Taro Hasegawa, Toyota (JP); Naoya Higashimachi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 445 days.

(21) Appl. No.: 17/213,225

(22) Filed: Mar. 26, 2021

(65) Prior Publication Data

US 2021/0364631 A1    Nov. 25, 2021

(30) Foreign Application Priority Data

May 20, 2020    (JP) ................. 2020-088158

(51) Int. Cl.
| | |
|---|---|
| *B60R 11/04* | (2006.01) |
| *G01S 13/931* | (2020.01) |
| *G01S 13/86* | (2006.01) |
| *B60R 11/00* | (2006.01) |

(52) U.S. Cl.
CPC .......... *G01S 13/931* (2013.01); *B60R 11/00* (2013.01); *G01S 13/86* (2013.01); *B60R 2011/004* (2013.01); *G01S 2013/9327* (2020.01)

(58) Field of Classification Search
None
See application file for complete search history.

(56) References Cited

U.S. PATENT DOCUMENTS

| | | | |
|---|---|---|---|
| 10,099,630 B1 * | 10/2018 | Krishnan | G01S 7/4813 |
| 2016/0334790 A1 | 11/2016 | Rust et al. | |
| 2017/0305360 A1 | 10/2017 | Zajac | |
| 2020/0023788 A1 | 1/2020 | Frederick et al. | |
| 2020/0084920 A1 | 3/2020 | Frederick et al. | |

FOREIGN PATENT DOCUMENTS

| | | |
|---|---|---|
| CN | 107433915 A | 12/2017 |
| JP | 2009-113784 A | 5/2009 |
| JP | 6415649 B1 | 10/2018 |
| JP | 2020-033002 A | 3/2020 |
| JP | 2020-040657 A | 3/2020 |

* cited by examiner

*Primary Examiner* — Hoon K Song
(74) *Attorney, Agent, or Firm* — HAUPTMAN HAM, LLP

(57) ABSTRACT

A vehicle sensor mounting structure includes a first sensor kit and a second sensor kit, each having a sensor group including a plurality of sensors and a bracket on an upper surface of which the sensor group is installed, a first fitting portion which is provided on a front side of the roof in a vehicle front-rear direction and into which a first bracket is fitted such that the upper surface is exposed, and a second fitting portion which is provided on a rear side of the roof in the vehicle front-rear direction so as to face the first fitting portion in the vehicle front-rear direction and into which a second bracket is fitted such that the upper surface is exposed. The plurality of sensors of each sensor group includes at least two kinds of sensors selected from among a camera, a millimeter wave radar, and a LiDAR sensor.

3 Claims, 10 Drawing Sheets

VEHICLE SENSOR MOUNTING STRUCTURE AND VEHICLE SENSOR BRACKET SET

CROSS-REFERENCE TO RELATED APPLICATION

This application claims priority to Japanese Patent Application No. 2020-088158 filed on May 20, 2020, incorporated herein by reference in its entirety.

BACKGROUND

1. Technical Field

The present disclosure relates to a vehicle sensor mounting structure and a vehicle sensor bracket set.

2. Description of Related Art

US 2016-0334790 A is known as a technical document relating to a vehicle sensor mounting structure. This publication describes a structure in which sensors are integrally arranged in the center of a roof of a vehicle.

SUMMARY

However, when the sensors are gathered in the center of the roof of the vehicle, blind spots of the sensors tend to occur due to the roof end in the front-rear direction of the vehicle. In this case, when the mounting positions of the sensors are raised to reduce the blind spots of the sensors in the front-rear direction of the vehicle, the aerodynamic performance of the vehicle is deteriorated and the rigidity of the mounting portions of the sensors is lowered, which may cause a decrease in sensor accuracy due to vibration or wind during traveling.

An aspect of the present disclosure is a vehicle sensor mounting structure in which multiple sensors configured to detect an external environment are mounted on a roof of a vehicle. The vehicle sensor mounting structure includes a first sensor kit, a second sensor kit, a first fitting portion, and a second fitting portion. The first sensor kit has a first sensor group, and a first bracket on an upper surface of which the first sensor group is installed. The first sensor group includes a plurality of sensors included in the multiple sensors, and the plurality of sensors includes at least two kinds of sensors selected from among a camera, a millimeter wave radar, and a Light Detection and Ranging sensor. The second sensor kit has a second sensor group, and a second bracket on an upper surface of which the second sensor group is installed. The second sensor group includes a plurality of sensors included in the multiple sensors, and the plurality of sensors includes at least two kinds of sensors selected from among a camera, a millimeter wave radar, and a Light Detection and Ranging sensor. The first fitting portion is provided on a front side of the roof in a vehicle front-rear direction. The first bracket is fitted into the first fitting portion such that the upper surface is exposed. The second fitting portion is provided on a rear side of the roof in the vehicle front-rear direction so as to face the first fitting portion in the vehicle front-rear direction. The second bracket is fitted into the second fitting portion such that the upper surface is exposed.

According to the vehicle sensor mounting structure of the above aspect of the present disclosure, the first sensor kit is fitted into the first fitting portion provided on the front side of the roof in the vehicle front-rear direction, and the second sensor kit fitted into the second fitting portion provided on the rear side of the roof in the vehicle front-rear direction. Therefore, as compared with the structure in the related art in which the sensors are gathered in the center of the roof, the blind spots of the sensors in the vehicle front-rear direction can be reduced without raising the mounting positions of the sensors. Further, since the first sensor group composed of a plurality of sensors is mounted on the first bracket to provide an assembly, which is composed of the first sensor group and the first bracket, as the first sensor kit, it is possible to maintain the mutual positional relationships of the sensors with high accuracy, as compared with the case where the sensors are individually mounted on the roof. This leads to improvement in the accuracy of various vehicle controls using a plurality of sensors. Moreover, since the first sensor kit can be mounted on the vehicle by fitting and fixing the pre-assembled first sensor kit to the first fitting portion provided in advance on the roof side, as compared with the case where the sensors are individually mounted on the roof, mounting man-hours can be reduced. Since the first sensor kit can be diverted to different types of vehicles, it also leads to a reduction in design man-hours. The above points also apply to the second sensor kit.

In the vehicle sensor mounting structure according to the above aspect of the present disclosure, the first sensor group may include a front sensor group facing a front side of the vehicle, a front right sensor group facing a front right side of the vehicle, and a front left sensor group facing a front left side of the vehicle. The second sensor group may include a rear sensor group facing a rear side of the vehicle, a rear right sensor group facing a rear right side of the vehicle, and a rear left sensor group facing a rear left side of the vehicle. According to this vehicle sensor mounting structure, as compared with the case where a plurality of sensors are individually directly mounted on the right and left sides of the roof in the vehicle width direction, many sensors can be provided as an assembly component, so that the mutual positional relationships of many sensors can be maintained with high accuracy. This also contributes to reducing mounting man-hours.

In the vehicle sensor mounting structure according to the above aspect of the present disclosure, the first bracket may be a U-shaped member in a plan view having a front portion which extends in a vehicle width direction on the roof and on which the front sensor group is installed, a front right side portion which extends from a right end of the front portion toward the rear side of the vehicle and on which the front right sensor group is installed, and a front left side portion which extends from a left end of the front portion toward the rear side of the vehicle and on which the front left sensor group is installed. The second bracket may be a U-shaped member in a plan view having a rear portion which extends in a vehicle width direction on the roof and on which the rear sensor group is installed, a rear right side portion which extends from a right end of the rear portion toward the front side of the vehicle and on which the rear right sensor group is installed, and a rear left side portion which extends from a left end of the rear portion toward the front side of the vehicle and on which the rear left sensor group is installed. According to this vehicle sensor mounting structure, by using the U-shaped first bracket in a plan view, the front sensor group, the front right sensor group, and the front left sensor group constituting the first sensor group can be arranged with margins. The same applies to the second bracket and the second sensor group.

In the vehicle sensor mounting structure according to the above aspect of the present disclosure, the front right side portion and the front left side portion of the first bracket may be provided so as to extend across a roof reinforcement extending in the vehicle width direction in a plan view. According to this vehicle sensor mounting structure, since the front right side portion and the front left side portion of the U-shaped first bracket are provided so as to extend across the roof reinforcement extending in the vehicle width direction in a plan view, as compared with the case where the front right side portion and the front left side portion of the first bracket are provided so as not to extend across the roof reinforcement, the rigidity can be increased.

In the vehicle sensor mounting structure according to the above aspect of the present disclosure, the first bracket and the second bracket may be I-shaped members. According to this vehicle sensor mounting structure, since the first bracket and the second bracket are I-shaped members, as compared with the case where the first bracket and the second bracket have complicated shapes, they can be easily mounted on the roof.

Another aspect of the present disclosure is a vehicle sensor bracket set for mounting multiple sensors configured to detect an external environment on a roof of a vehicle. The vehicle sensor bracket set includes a first bracket and a second bracket. A first sensor group is installed on an upper surface of the first bracket. The first sensor group includes a plurality of sensors that are included in the multiple sensors, and the plurality of sensors includes at least two kinds of sensors selected from among a camera, a millimeter wave radar, and a Light Detection and Ranging sensor. A second sensor group is installed on an upper surface of the second bracket. The second sensor group includes a plurality of sensors that are included in the multiple sensors, and the plurality of sensors includes at least two kinds of sensors selected from among a camera, a millimeter wave radar, and a Light Detection and Ranging sensor. The first bracket is fitted into a first fitting portion provided on a front side of the roof in a vehicle front-rear direction with the upper surface exposed. The second bracket is fitted into a second fitting portion provided on a rear side of the roof in the vehicle front-rear direction with the upper surface exposed so as to face the first bracket in the vehicle front-rear direction.

According to the vehicle sensor bracket set of the above aspect of the present disclosure, the first sensor kit is fitted into the first fitting portion provided on the front side of the roof in the vehicle front-rear direction, and the second sensor kit fitted into the second fitting portion provided on the rear side of the roof in the vehicle front-rear direction. Therefore, as compared with the case in the related art in which the sensors are gathered in the center of the roof, the blind spots of the sensors in the vehicle front-rear direction can be reduced without raising the mounting positions of the sensors. Further, since the first sensor group composed of a plurality of sensors is mounted on the first bracket to provide an assembly, which is composed of the first sensor group and the first bracket, as the first sensor kit, it is possible to maintain the mutual positional relationships of the sensors with high accuracy, as compared with the case where the sensors are individually mounted on the roof. This leads to improvement in the accuracy of various vehicle controls using a plurality of sensors. Moreover, since the first sensor kit can be mounted on the vehicle by fitting and fixing the pre-assembled first sensor kit to the first fitting portion provided in advance on the roof side, as compared with the case where the sensors are individually mounted on the roof, mounting man-hours can be reduced. Since the first sensor kit can be diverted to different types of vehicles, it also leads to a reduction in design man-hours. The above points also apply to the second sensor kit.

In the vehicle sensor bracket set according to the above aspect of the present disclosure, the first bracket may be a U-shaped member in a plan view having a front portion extending in a vehicle width direction on the roof, a front right side portion extending from a right end of the front portion toward a rear side of the vehicle, and a front left side portion extending from a left end of the front portion toward the rear side of the vehicle. The second bracket may be a U-shaped member in a plan view having a rear portion extending in the vehicle width direction on the roof, a rear right side portion extending from a right end of the rear portion toward a front side of the vehicle, and a rear left side portion extending from a left end of the rear portion toward the front side of the vehicle. According to this vehicle sensor bracket set, by using the U-shaped first bracket in a plan view, sensors facing the front side of the vehicle, sensors facing the front right side of the vehicle, and sensors facing the front left side of the vehicle can be arranged with margins. The same applies to the second bracket.

According to the vehicle sensor mounting structure and the vehicle sensor bracket set of the above aspects, as compared with the structure in the related art in which the sensors are gathered in the center of the roof, the blind spots of the sensors in the vehicle front-rear direction can be reduced without raising the mounting positions of the sensors. Further, since the first sensor group composed of a plurality of sensors is mounted on the first bracket to provide an assembly, which is composed of the first sensor group and the first bracket, as the first sensor kit, it is possible to maintain the mutual positional relationships of the sensors with high accuracy, as compared with the case where the sensors are individually mounted on the roof.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. A vehicle sensor mounting structure in the present disclosure is a mounting structure for sensors mounted on a roof of a vehicle to detect the external environment of the vehicle. The type of the vehicle and the shape of the roof are not particularly limited. The external environment includes, for example, the situation of other vehicles around the vehicle.

Figure 1:
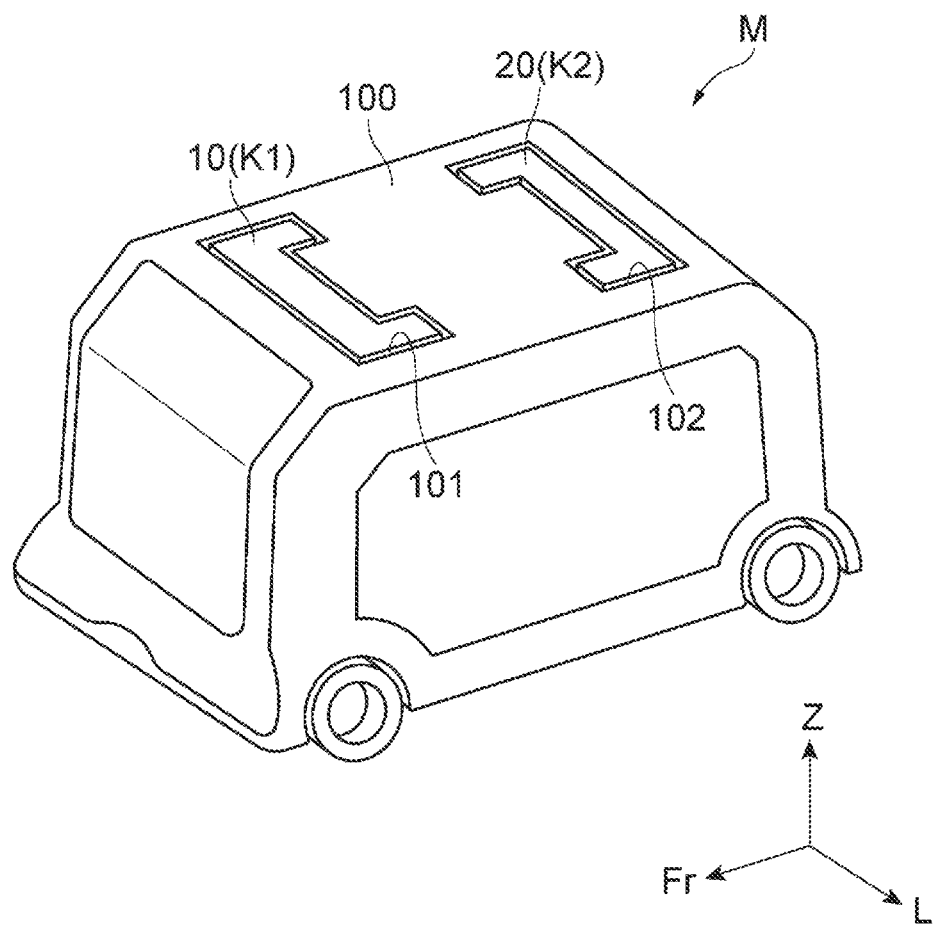
FIG. 1 is a perspective view of an entire vehicle for illustrating a vehicle sensor mounting structure according to an embodiment.

FIG. 1 is a perspective view of an entire vehicle for illustrating a vehicle sensor mounting structure according to the embodiment. In FIG. 1, the illustration of the sensors is omitted. In each figure, a three-dimensional orthogonal coordinate system is shown in which the front direction of a vehicle M is indicated as Fr, the left direction of the vehicle M is indicated as L, and the upward direction of the vehicle M is indicated as Z.

The vehicle M shown in FIG. 1 is, for example, an autonomous driving vehicle having an autonomous driving function. Autonomous driving means vehicle control that automatically travels toward a destination without the driver performing a driving operation. The vehicle M is not necessarily limited to an autonomous driving vehicle.

The vehicle M has a roof 100. The roof 100 has a first fitting portion 101 on the front side in a vehicle front-rear direction and a second fitting portion 102 on the rear side in the vehicle front-rear direction. The first fitting portion 101 and the second fitting portion 102 are holes or recesses provided so as to face each other in the vehicle front-rear direction. The first fitting portion 101 and the second fitting portion 102 may be defined not only on the surface of the roof 100 but also together with the roof reinforcement described later.

As an example, when the roof 100 is divided into three equal parts in the vehicle front-rear direction, the first fitting portion 101 and the second fitting portion 102 are provided so as to be included in a region on the front side in the vehicle front-rear direction and a region on the rear side in the vehicle front-rear direction. When the roof 100 is divided into four equal parts in the vehicle front-rear direction, the first fitting portion 101 and the second fitting portion 102 may be provided so as to be included in a region on the frontmost side in the vehicle front-rear direction and a region on the rearmost side in the vehicle front-rear direction.

A first bracket 10 constituting a first sensor kit K1 is fitted into the first fitting portion 101. Further, a second bracket 20 constituting a second sensor kit K2 is fitted into the second fitting portion 102. The first bracket 10 and the second bracket 20 constitute a vehicle sensor bracket set.

Figure 2:
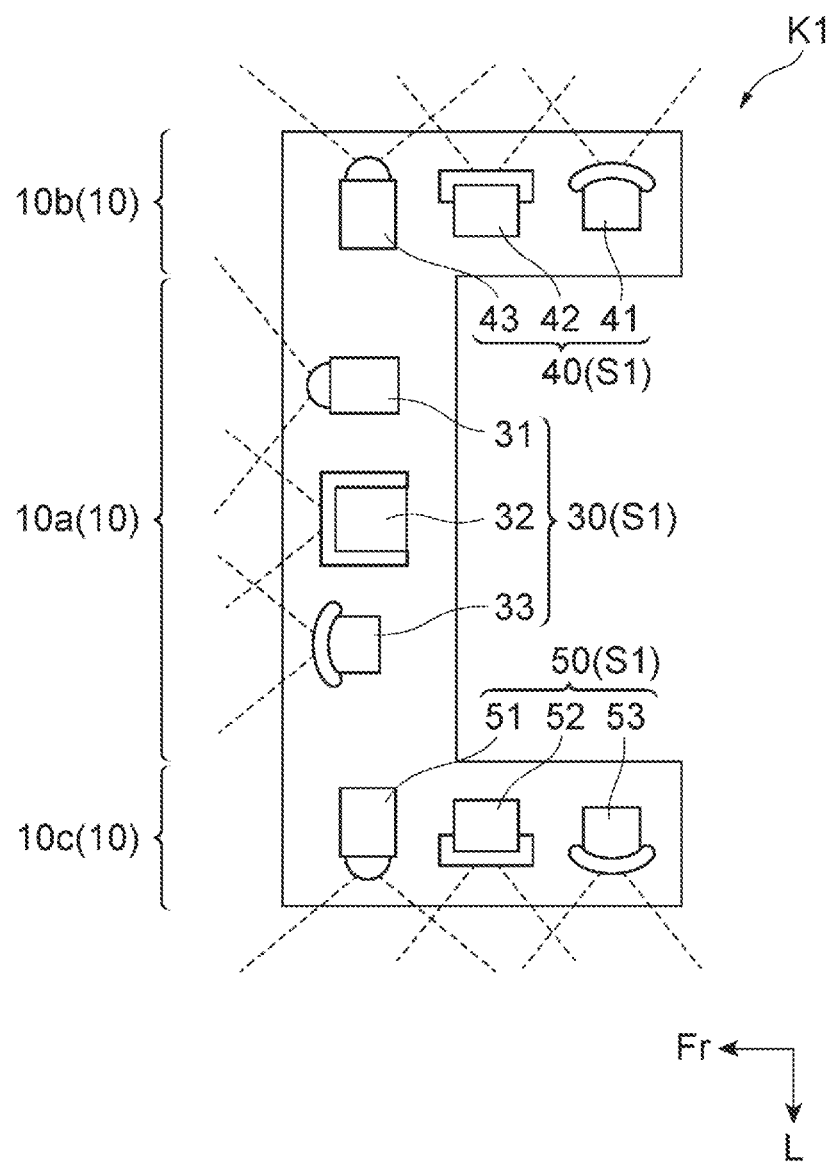
FIG. 2 is a diagram showing an example of sensor arrangement in a first sensor kit.

FIG. 2 is a diagram showing an example of sensor arrangement in the first sensor kit K1. As shown in FIG. 2, the first sensor kit K1 includes a first sensor group S1 and the first bracket 10. The first sensor group S1 includes a plurality of sensors, the plurality of sensors including at least two kinds of sensors selected from among a camera, a millimeter wave radar, and a Light Detection and Ranging (LiDAR) sensor. The first sensor group S1 is installed on the upper surface of the first bracket 10.

The first sensor group S1 includes a front sensor group 30 facing the front of the vehicle, a front right sensor group 40 facing the front right side of the vehicle, and a front left sensor group 50 facing the front left side of the vehicle. The front sensor group 30 includes sensors 31, 32, and 33. The combination of the sensors 31, 32, and 33 is not particularly limited, but may be, for example, a combination of a millimeter wave radar, a LiDAR sensor, and a camera. The same applies to the sensors 41, 42, and 43 constituting the front right sensor group 40 and the sensors 51, 52, and 53 constituting the front left sensor group 50.

The number of sensors included in the front sensor group 30, the front right sensor group 40, and the front left sensor group 50 is not particularly limited, and it is only necessary that the front sensor group 30, the front right sensor group 40, and the front left sensor group 50 each include at least one or more sensors. The first sensor group S1 only needs to include at least the front sensor group 30, and does not necessarily include the front right sensor group 40 and the front left sensor group 50.

The first bracket 10 is a member for mounting the first sensor group S1 on the roof 100. The first sensor group S1 is installed on the first bracket 10 by bolts, screws, or adhesive fixing. The first bracket 10 is a U-shaped member in a plan view having a front portion 10a, a front right side portion 10b, and a front left side portion 10c.

The front portion 10a extends in a vehicle width direction on the roof 100, and is a portion where the front sensor group 30 is installed. The front right side portion 10b extends from the right end of the front portion 10a toward the rear of the vehicle, and is a portion where the front right sensor group 40 is installed. The front left side portion 10c extends from the left end of the front portion 10a toward the rear of the vehicle, and is a portion where the front left sensor group 50 is installed.

Figure 3A:
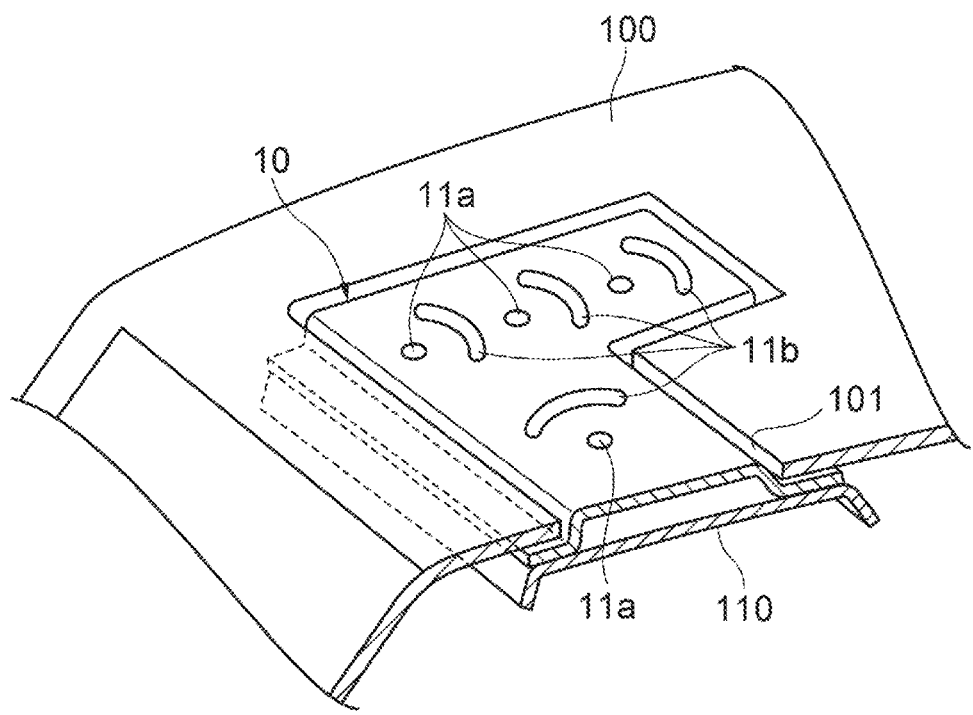
FIG. 3A is a partial sectional view for illustrating the vehicle sensor mounting structure.
Figure 3B:
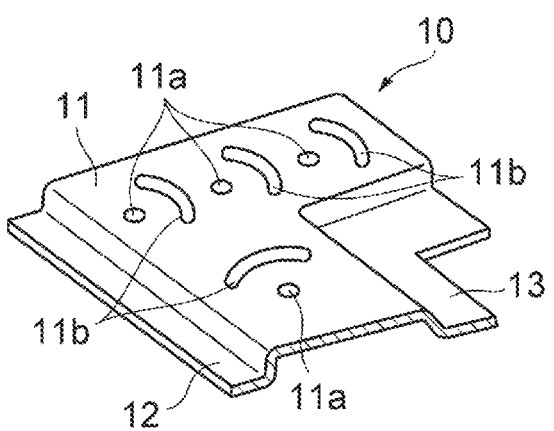
FIG. 3B is a partial sectional view showing an example of a first bracket.

Subsequently, the vehicle sensor mounting structure will be described with reference to FIGS. 3A and 3B. FIG. 3A is a partial sectional view for illustrating the vehicle sensor mounting structure. FIG. 3B is a partial sectional view showing an example of the first bracket 10.

As shown in FIGS. 3A and 3B, the first bracket 10 has a sensor mounting surface (upper surface) 11 on which the sensors are installed, and an outer peripheral edge portion 12 and an inner peripheral edge portion 13 for fitting into the first fitting portion 101. The first bracket 10 is made of, for example, a single metal plate or a single resin plate.

The height of the sensor mounting surface 11 is not particularly limited, but as an example, the sensor mounting surface 11 may have the same height as the upper surface of the roof 100. The height of the sensor mounting surface 11 may be higher than the upper surface of the roof 100 or slightly lower than the upper surface of the roof 100. The first bracket 10 is fitted into the first fitting portion 101 so that the sensor mounting surface 11 is exposed.

A plurality of reference holes 11a and adjusting elongated holes 11b for mounting the sensors are provided on the sensor mounting surface 11. The reference hole 11a is a circular hole. The adjusting elongated hole 11b is an arc-shaped elongated hole provided along a circle centered on the reference hole 11a. Each sensor is installed on the sensor mounting surface 11 by, for example, a bolt inserted from below into the reference hole 11a and the adjusting elongated hole 11b. The position of the bolt inserted into the arc-shaped adjusting elongated hole 11b can be adjusted in the circular direction centered on the reference hole 11a. Thus, each sensor is installed on the sensor mounting surface 11 so as to be adjustable in the yawing direction of the vehicle. The orientation adjustment of the sensor will be described in detail later.

The outer peripheral edge portion 12 is provided along the outer peripheral side (outer side of the roof 100) of the U-shaped sensor mounting surface 11, and is provided at a position that is one step lower than the sensor mounting surface 11. Similarly, the inner peripheral edge portion 13 is provided along the inner peripheral side (center side of the roof 100) of the U-shaped sensor mounting surface 11, and is provided at a position that is one step lower than the sensor mounting surface 11. The outer peripheral edge portion 12 and the inner peripheral edge portion 13 are fitted under the roof 100 to suppress the first bracket 10 from falling off. The outer peripheral edge portion 12 and the inner peripheral edge portion 13 constitute the lower surface of the first bracket 10. As an example, the lower surfaces of the outer peripheral edge portion 12 and the inner peripheral edge portion 13 are in contact with a roof reinforcement 110 extending in the vehicle width direction.

The outer peripheral edge portion 12 and the inner peripheral edge portion 13 do not necessarily have to be supported by the roof reinforcement 110. The first fitting portion 101 may be provided by providing a recessed portion in a part of the roof 100, or the first bracket 10 may be supported by other members fixed to the vehicle body. Further, it is not necessary to support the first bracket 10 from below, and the outer peripheral edge portion 12 and the inner peripheral edge portion 13 may be fixed to the back surface of the roof 100 by adhesion or welding.

The second sensor kit K2 may have the same configuration as the first sensor kit K1. For example, the second sensor kit K2 may have the same configuration as the first sensor kit K1 except that the second sensor kit K2 is fitted into the second fitting portion 102 on the rear side in the vehicle front-rear direction.

A second sensor group constituting the second sensor kit K2 may have the same configuration as the first sensor group S1 of the first sensor kit K1. The second sensor group may include a rear sensor group facing the rear of the vehicle, a rear right sensor group facing the rear right side of the vehicle, and a rear left sensor group facing the rear left side of the vehicle. The rear sensor group, the rear right sensor group, and the rear left sensor group correspond to the front sensor group 30, the front right sensor group 40, and the front left sensor group 50 of the first sensor group S1, respectively.

The second sensor group does not necessarily have the same configuration as the first sensor group S1. The second sensor group may have a combination of sensors or the number of sensors different from those of the first sensor group S1. The second sensor group may be composed of only the rear sensor group.

The second bracket 20 may have the same configuration as the first bracket 10. The second bracket 20 may be a U-shaped member in a plan view having a rear portion which extends in the vehicle width direction on the roof 100 and on which the rear sensor group is installed, a rear right side portion which extends from the right end of the rear portion toward the front of the vehicle and on which the rear right sensor group is installed, and a rear left side portion which extends from the left end of the rear portion toward the front of the vehicle and on which the rear left sensor group is installed. The second bracket 20 does not necessarily have the same configuration as the first bracket 10. The second bracket 20 may have a shape different from that of the first bracket 10. A modification of the bracket will be described in detail later.

Figure 4:
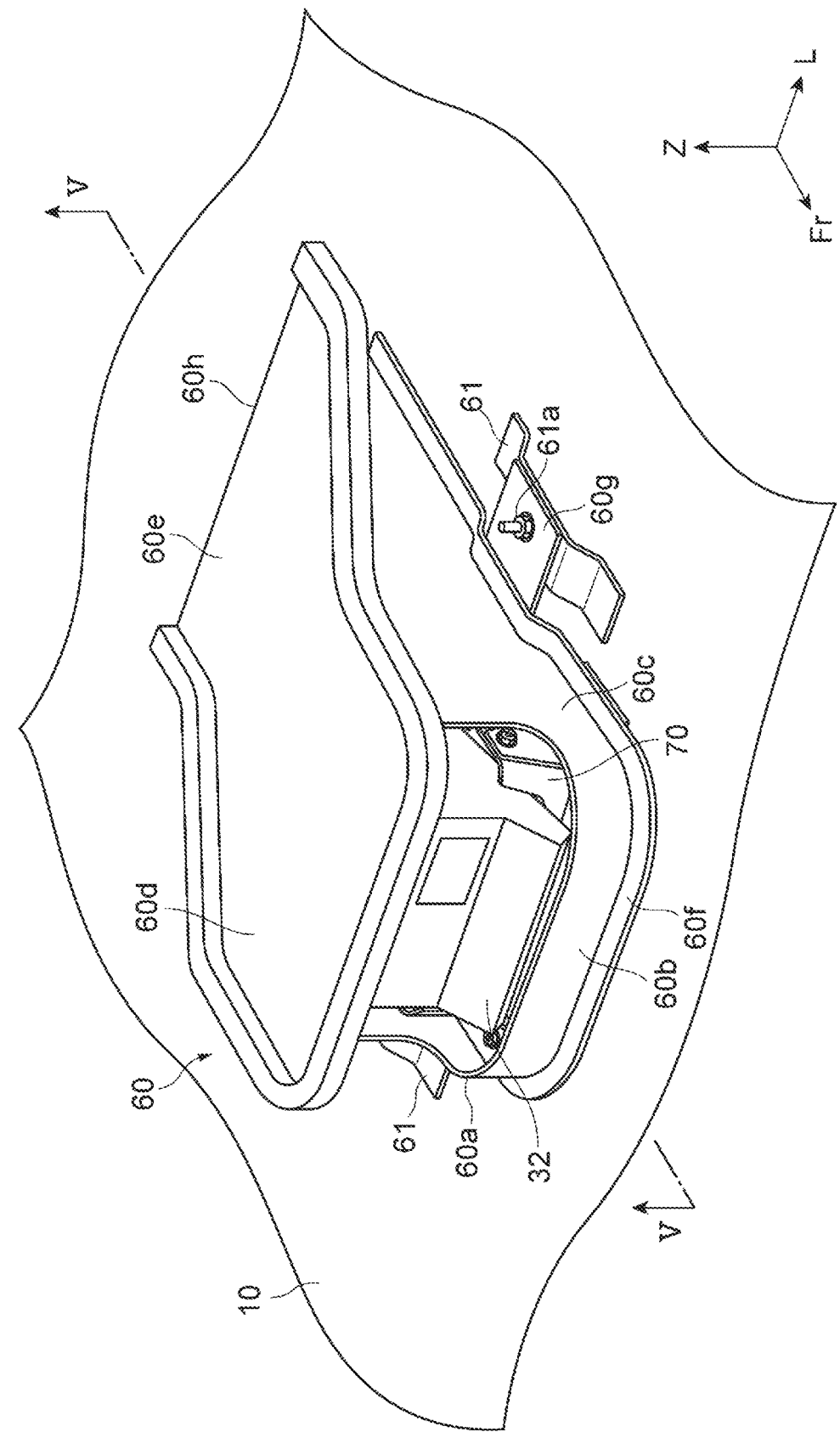
FIG. 4 is a perspective view showing an example of a sensor mounting structure on the first bracket.
Figure 5:
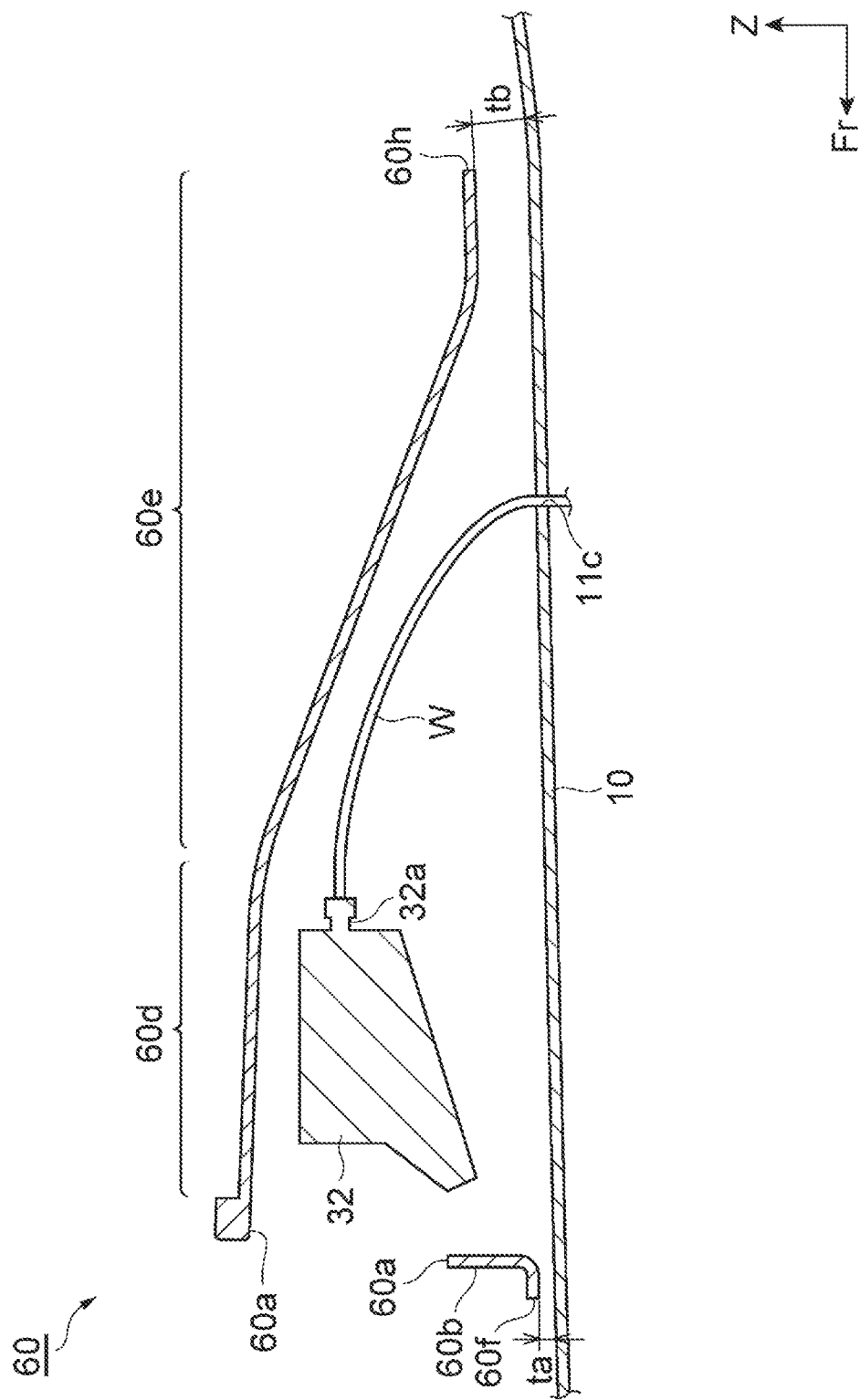
FIG. 5 is an end view taken along a line V-V of FIG. 4.

FIG. 4 is a perspective view showing an example of a sensor mounting structure on the first bracket 10. FIG. 5 is an end view taken along a line V-V of FIG. 4. Here, as an example, the mounting structure of a camera 32 in the front sensor group 30 of the first sensor group S1 facing the front of the vehicle will be described.

As shown in FIGS. 4 and 5, the vehicle sensor mounting structure of the present embodiment includes the camera 32, a cover member 60, and a sensor bracket 70. The camera 32 is an example of a sensor mounted on the roof 100 of the vehicle for detecting the external environment of the vehicle. In the present embodiment, the camera 32 is mounted so as to capture an image of the front of the vehicle.

The type of the camera 32 is not particularly limited. The camera 32 may be a monocular camera or a stereo camera. Further, the sensor for detecting the external environment of the vehicle is not limited to the camera, and may be a millimeter wave radar, a microwave radar, a LiDAR sensor, an infrared sensor, a sonar sensor, or the like.

The camera 32 is connected to a vehicle battery and an electronic control unit (ECU) via a wire harness W (see FIG. 5). The wire harness W is an assembly component composed of a bundle of a plurality of electric wires used for power supply and signal transmission. The camera 32 has a connecting portion 32a on the back surface for connecting to the wire harness W. The position of the connecting portion 32a is not limited to the back surface of the camera 32. The connecting portion 32a may be located on the lower surface, the side surface, or the upper surface of the camera 32. The wire harness W passes through a wire passage hole 100a provided on the roof 100 from below, and is pulled out into the inside of the cover member 60 to be connected to the camera 32.

The sensor bracket 70 is a member that is mounted on the roof 100 and that supports the camera 32 serving as a sensor so that the camera 32 is swingable. The sensor bracket 70 is made of, for example, resin or metal (aluminum, etc.). The sensor bracket 70 may be mounted on the roof 100 via another member. The configuration of the sensor bracket 70 will be described later.

The cover member 60 is a member provided on the roof 100 so as to cover the camera 32 from above. The cover member 60 is made of, for example, resin. The cover member 60 may be made of the same material as a vehicle bumper or the like. The cover member 60 has a sensor opening portion 60a, a front wall portion 60b, side wall portions 60c, a sensor cover portion 60d, and a wire harness cover portion 60e.

The sensor opening portion 60a opens toward the front (outer peripheral side) of the vehicle, and the camera 32 captures an image of the front of the vehicle through the sensor opening portion 60a. The sensor opening portion 60a is provided as an opening having a size that does not interfere with capturing the image of the external environment even when the orientation of the camera 32 is adjusted.

The front wall portion 60b is a wall portion on the front side that constitutes the cover member 60. The front wall portion 60b is located in front of the camera 32 and defines the lower edge of the sensor opening portion 60a. The lower end of the front wall portion 60b projects forward to constitute a front end edge 60f.

The front end edge 60f is the frontmost portion of the cover member 60 (see FIG. 5). The lower surface of the front end edge 60f is not in contact with the roof 100, and an air introduction gap ta is provided between the front end edge 60f and the roof 100. The size of the air introduction gap ta is not particularly limited, but may be, for example, 5 mm. The air introduction gap ta may be 7 mm or 10 mm. The air introduction gap ta may have any size of 5 mm or more. When the vehicle is traveling, air enters the cover member 60 through the air introduction gap ta.

The side wall portions 60c are a pair of right and left wall portions constituting the cover member 60. The side wall portions 60c constitute the right and left edges of the sensor opening portion 60a. The lower surface of each of the side wall portions 60c is also not in close contact with the roof 100, and a gap is provided between the lower surface of the side wall portion 60c and the roof 100.

A fastening plate portion 60g protruding toward the sides of the cover member 60 is adhered to the lower surface of each of the side wall portions 60c. The fastening plate portion 60g is fixed to the roof 100 by being fastened to a cover fastening member 61 with a bolt 61a. The cover fastening member 61 is formed by bending a metal plate into a substantially hat shape in a side view. The cover fastening member 61 has a pair of leg portions fixed to the roof 100 and a central base portion that is lifted and supported by the pair of leg portions and that has a bolt hole through which the bolt 61a passes.

The cover member 60 is fixed to the roof 100 by fastening the fastening plate portion 60g and the cover fastening member 61. The fastening plate portion 60g and the cover fastening member 61 are also provided on the right side of the cover member 60, and thus the cover member 60 is fixed to the roof 100 from the right and left sides. The fixing structure of the cover member 60 is not limited to the above structure, and a well-known fixing structure may be adopted.

The sensor cover portion 60d is a portion that constitutes the ceiling portion of the cover member 60. The sensor cover portion 60d is provided so as to cover the camera 32 from above the camera 32, and constitutes the upper edge of the sensor opening portion 60a. The sensor cover portion 60d is provided so as to provide a space having a sufficient height for accommodating the camera 32.

The wire harness cover portion 60e is a portion that constitutes the ceiling portion of the cover member 60 together with the sensor cover portion 60d. The wire harness cover portion 60e is provided so as to cover the wire harness W connected to the camera 32 from above. The wire harness cover portion 60e and the side wall portions 60c provide a space for accommodating the wire harness W. The wire harness W is not exposed to the outside of the cover member 60.

The wire harness cover portion 60e is a portion continuous with the sensor cover portion 60d, and is a portion of the cover member 60 located on the inner side of (closer to the center of) the roof 100. The wire harness cover portion 60e is provided on the rear side of the sensor cover portion 60d in the cover member 60.

The wire harness cover portion 60e is provided such that the height of the wire harness cover portion 60e approaches the height of the roof 100 as the distance from the sensor opening portion 60a increases (toward the rear of the vehicle). That is, the cover member 60 is provided such that the height of the cover member 60 approaches the height of the roof 100 as the distance from the sensor opening portion 60a increases in order to avoid generation of vortices that cause wind noise while the vehicle is traveling. As an example, the wire harness cover portion 60e has a streamlined shape in which its height decreases toward the rear of the vehicle.

A rear end edge 60h of the wire harness cover portion 60e is the rearmost portion of the cover member 60 (see FIG. 5). The lower surface of the rear end edge 60h is not in contact with the roof 100, and an air discharge gap tb is provided between the rear end edge 60h and the roof 100.

The size of the air discharge gap tb is not particularly limited, but may be, for example, 20 mm. The air discharge gap tb may be 15 mm or 30 mm. The air discharge gap tb may be a gap larger than the air introduction gap to provided on the front end side of the cover member 60. While the vehicle is traveling, air is discharged to the outside of the cover member 60 from the air discharge gap tb. When it is raining, rainwater that has entered the cover member 60 from the sensor opening portion 60a or the like can be discharged.

Figure 6:
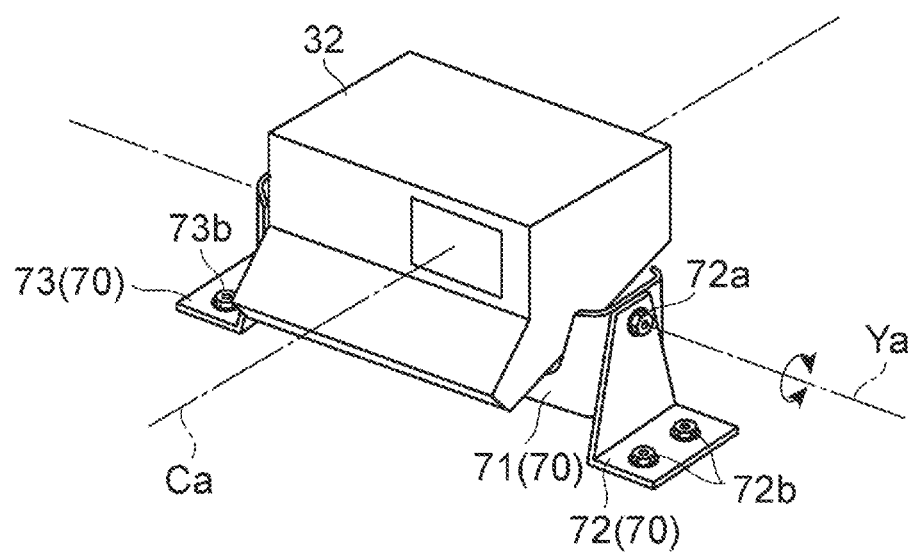
FIG. 6 is a perspective view showing an example of a camera and a sensor bracket.
Figure 7:
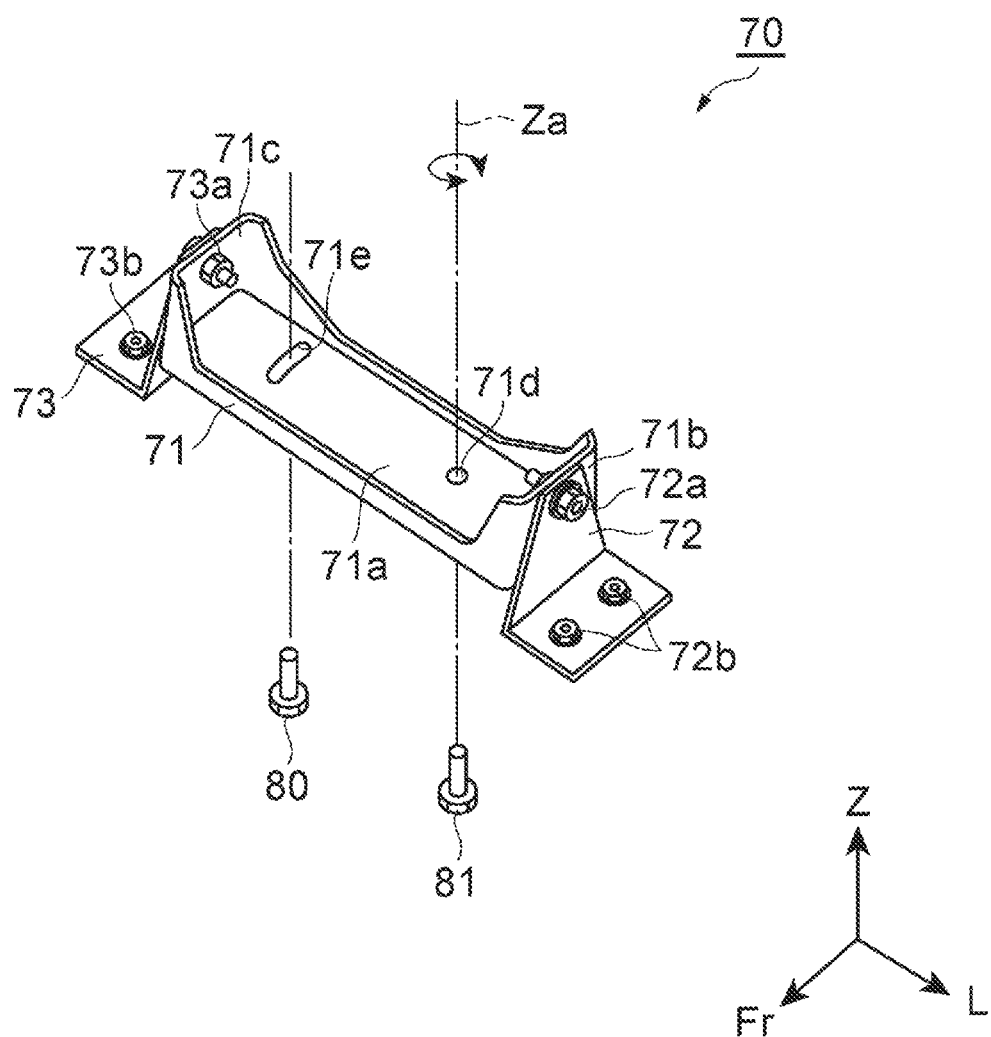
FIG. 7 is a perspective view showing an example of the sensor bracket.
Figure 8:
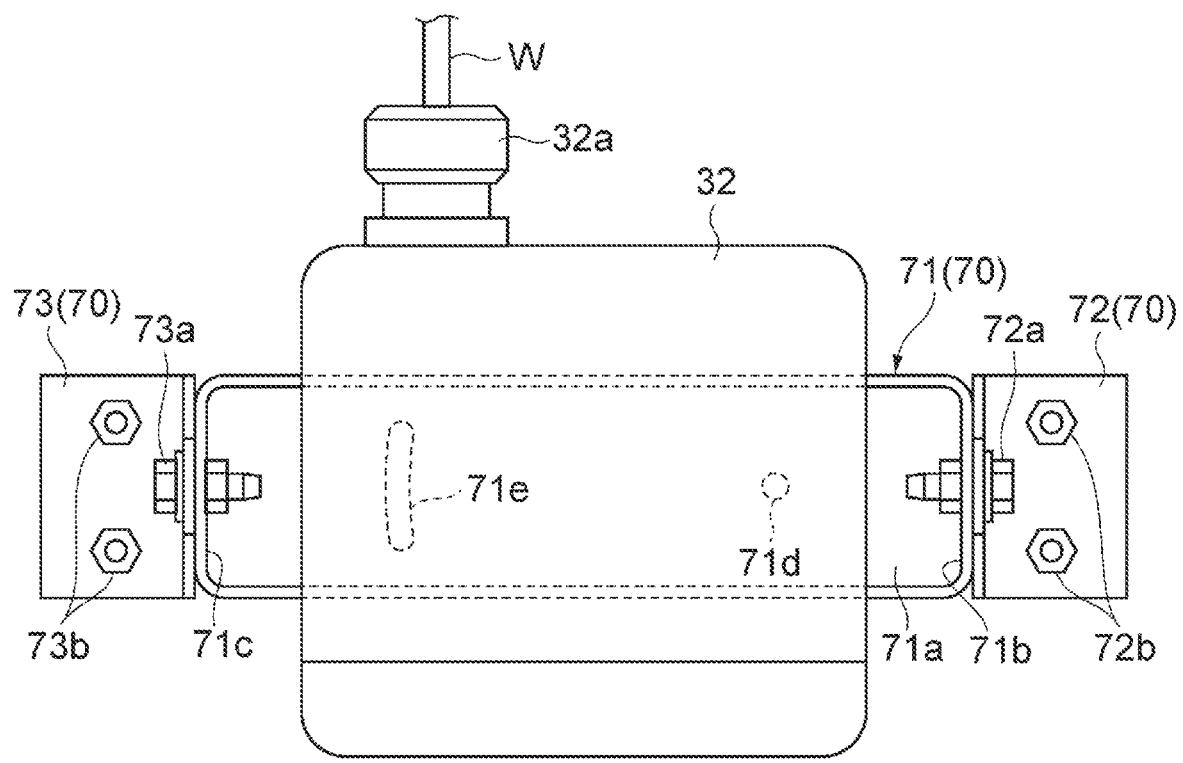
FIG. 8 is a plan view showing an example of the camera and the sensor bracket.

Next, the support structure of the sensor bracket 70 will be described with reference to FIGS. 6 to 8. FIG. 6 is a perspective view showing an example of the camera 32 and the sensor bracket 70. FIG. 7 is a perspective view showing an example of the bracket. FIG. 8 is a plan view showing an example of the camera and the sensor bracket.

As shown in FIGS. 6 to 8, the sensor bracket 70 supports the camera 32 so that the camera 32 is swingable in the pitching direction and the yawing direction of the vehicle to be able to adjust the direction of the optical axis Ca of the camera 32. The swing axis Ya shown in FIG. 6 is a swing axis corresponding to the swing of the camera 32 in the pitching direction. The swing axis Za shown in FIG. 7 is a swing axis corresponding to the swing of the camera 32 in the yawing direction.

The sensor bracket 70 has a bracket body 71, a left leg portion 72, and a right leg portion 73. The bracket body 71 is a boat-shaped member that supports the camera 32 so as to hold the camera 32. The left leg portion 72 and the right leg portion 73 are provided on the left and right sides of the bracket body 71, and support the bracket body 71 so that the bracket body 71 is swingable in the pitching direction of the vehicle (around the swing axis Ya).

The left leg portion 72 and the right leg portion 73 are L-shaped plate members in a plan view that support the bracket body 71 from the left and right sides so that the bracket body 71 is swingable. One side of the L-shaped left leg portion 72 is connected to the bracket body 71 via a swinging bolt 72a, and the other side is fixed to the roof 100 via two roof bolts 72b. Similarly, one side of the L-shaped right leg portion 73 is connected to the bracket body 71 via a swinging bolt 73a, and the other side is fixed to the roof 100 via two roof bolts 73b.

The swinging bolt 72a and the swinging bolt 73a are provided so as to face each other with the bracket body 71 interposed therebetween, and support the bracket body 71 so that the bracket body 71 is swingable in the pitching direction of the vehicle. The facing direction of the swinging bolt 72a and the swinging bolt 73a corresponds to the extending direction of the swing axis Ya. The swinging bolt 72a and the swinging bolt 73a do not need to have a special configuration, and general bolts may be adopted.

In the sensor bracket 70, the bracket body 71 can swing around the swing axis Ya by adjusting the fastening force of the swinging bolt 72a and the swinging bolt 73a. That is, the terms "swingably supported" in the present embodiment also include the state where it is switchable between a state where the camera 32 (sensor) is swingable and a state where the camera 32 is locked (a state where the posture of the sensor can be maintained while the vehicle is traveling) by methods such as adjusting the fastening force of the swinging bolt 72a and the swinging bolt 73a. The terms "swingably supported" may include the state where it is switchable between a state where the camera 32 is swingable and a state where the camera 32 is locked by a well-known lock mechanism. As long as the camera 32 can be switched to a swingable state, the camera 32 is "swingably supported" even when the camera 32 is in the locked state. The same applies to the following description.

The terms "swingable in the pitching direction of the vehicle" is not limited to the case where the pitching direction of the vehicle and the swinging direction of the sensor coincide with each other. For example, when the angle (narrow angle) between the rotation center axis of the pitch of the vehicle (the virtual rotation center axis extending in the vehicle width direction) and the swing axis of the sensor in a plan view is less than 45°, the terms "swingable in the pitching direction of the vehicle" may apply.

As shown in FIG. 7, the bracket body 71 has a bottom surface 71a, a left wall portion 71b, and a right wall portion 71c. The left wall portion 71b is a wall portion connected to the left leg portion 72 via the swinging bolt 72a. The right wall portion 71c is a wall portion connected to the right leg portion 73 via the swinging bolt 73a. The left wall portion 71b and the right wall portion 71c are located so as to face each other with the bottom surface 71a interposed therebetween.

A camera reference hole 71d and an adjusting elongated hole 71e are provided on the bottom surface 71a. The camera reference hole 71d is a circular hole, and a camera bolt 81 to be connected to the camera 32 is inserted into the camera reference hole 71d from below. The insertion direction of the camera reference hole 71d corresponds to the swing axis Za. The adjusting elongated hole 71e is an arc-shaped elongated hole provided along a circle centered on the camera reference hole 71d. A camera bolt 80 to be connected to the camera 32 is also inserted into the adjusting elongated hole 71e from below.

For example, the camera bolts 80 and 81 are screwed into bolt grooves of the camera 32 while being inserted into the bottom surface 71a of the bracket body 71 from below, so that the camera 32 is mounted on the sensor bracket 70 (see FIG. 6). The position of the camera bolt 80 can be adjusted in the yawing direction of the vehicle along the arc-shaped adjusting elongated hole 71e. With this configuration, the camera 32 is supported so as to be swingable in the yawing direction of the vehicle around the camera bolt 81 passing through the camera reference hole 71d. A separate member having a bolt groove may be fixed to the lower surface of the camera 32.

According to the sensor mounting structure shown in FIGS. 4 to 8, the sensor bracket 70 supports the camera 32 (sensor) so that the camera 32 (sensor) is swingable, thereby the orientation of the camera 32 on the roof 100 can be adjusted. Further, since the sensor mounting structure includes the wire harness cover portion 60e that covers the wire harness W passing through the roof 100 from below and pulled out into the inside of the cover member 60 to be connected to the camera 32, the wire harness W can be suppressed from being exposed to the outside of the vehicle. As a result, in the sensor mounting structure, it is possible to suppress a decrease in camera accuracy due to damage to the wire harness W or the like, as compared with the case where the wire harness W is largely exposed. The sensor mounting structure is also suitable from the viewpoint of vehicle design.

Further, according to the sensor mounting structure, the camera 32 is supported so as to be swingable in the pitching direction of the vehicle and the yawing direction of the vehicle. Thus, as compared with the case where the camera 32 can swing in only one direction, the degree of freedom in adjusting the orientation of the camera 32 can be increased.

Further, according to the sensor mounting structure, the cover member 60 is provided such that the height of the cover member 60 approaches the height of the roof 100 toward the rear of the vehicle. Specifically, the wire harness cover portion 60e of the cover member 60 located on the inner side of the roof 100 (rear side in the vehicle front-rear direction) is provided such that the height of the wire harness cover portion 60e approaches the height of the roof 100 as the distance from the sensor opening portion 60a on the outer peripheral side of the roof 100 increases. Therefore, as compared with the case where the wire harness cover portion 60e constitutes a steep step, it is possible to suppress generation of vortices that cause wind noise while the vehicle is traveling.

According to the vehicle sensor mounting structure described above, the first sensor kit K1 is fitted into the first fitting portion 101 provided on the front side of the roof 100 in the vehicle front-rear direction, and the second sensor kit K2 fitted into the second fitting portion 102 provided on the rear side of the roof 100 in the vehicle front-rear direction. Therefore, as compared with the structure in the related art in which the sensors are gathered in the center of the roof, the blind spots of the sensors in the vehicle front-rear direction can be reduced without raising the mounting positions of the sensors.

Further, since the first sensor group S1 composed of a plurality of sensors is mounted on the first bracket 10 to provide an assembly, which is composed of the first sensor group S1 and the first bracket 10, as the first sensor kit K1, it is possible to maintain the mutual positional relationships of the sensors with high accuracy, as compared with the case where the sensors are individually mounted on the roof. This leads to improvement in the accuracy of various vehicle controls using a plurality of sensors.

Moreover, since the first sensor kit K1 can be mounted on the vehicle by fitting and fixing the pre-assembled first sensor kit K1 to the first fitting portion 101 provided in advance on the roof 100, as compared with the case where the sensors are individually mounted on the roof 100, mounting man-hours can be reduced. Since the first sensor kit K1 can be diverted to different types of vehicles, it also leads to a reduction in design man-hours. The above points also apply to the second sensor kit K2.

Further, according to the vehicle sensor mounting structure, since the first sensor group S1 has the front sensor group 30, the front right sensor group 40, and the front left sensor group 50, which are combined with the first bracket 10 as an assembly component, as compared with the case where a plurality of sensors are individually directly mounted on the roof 100 on the right and left sides of the roof 100 in the vehicle width direction, many sensors can be provided as an assembly component, so that the mutual positional relationships of many sensors can be maintained with high accuracy. This also contributes to reducing mounting man-hours.

Furthermore, according to the vehicle sensor mounting structure, by using the U-shaped first bracket 10 in a plan view, the front sensor group 30, the front right sensor group 40, and the front left sensor group 50 constituting the first sensor group S1 can be arranged with margins. The same applies to the second bracket 20 and the second sensor group.

Although the embodiment of the present disclosure has been described above, the present disclosure is not limited to the embodiment above. Including the embodiment described above, the present disclosure can be implemented in various modes including various modifications and improvements based on the knowledge of those skilled in the art.

Figure 9:
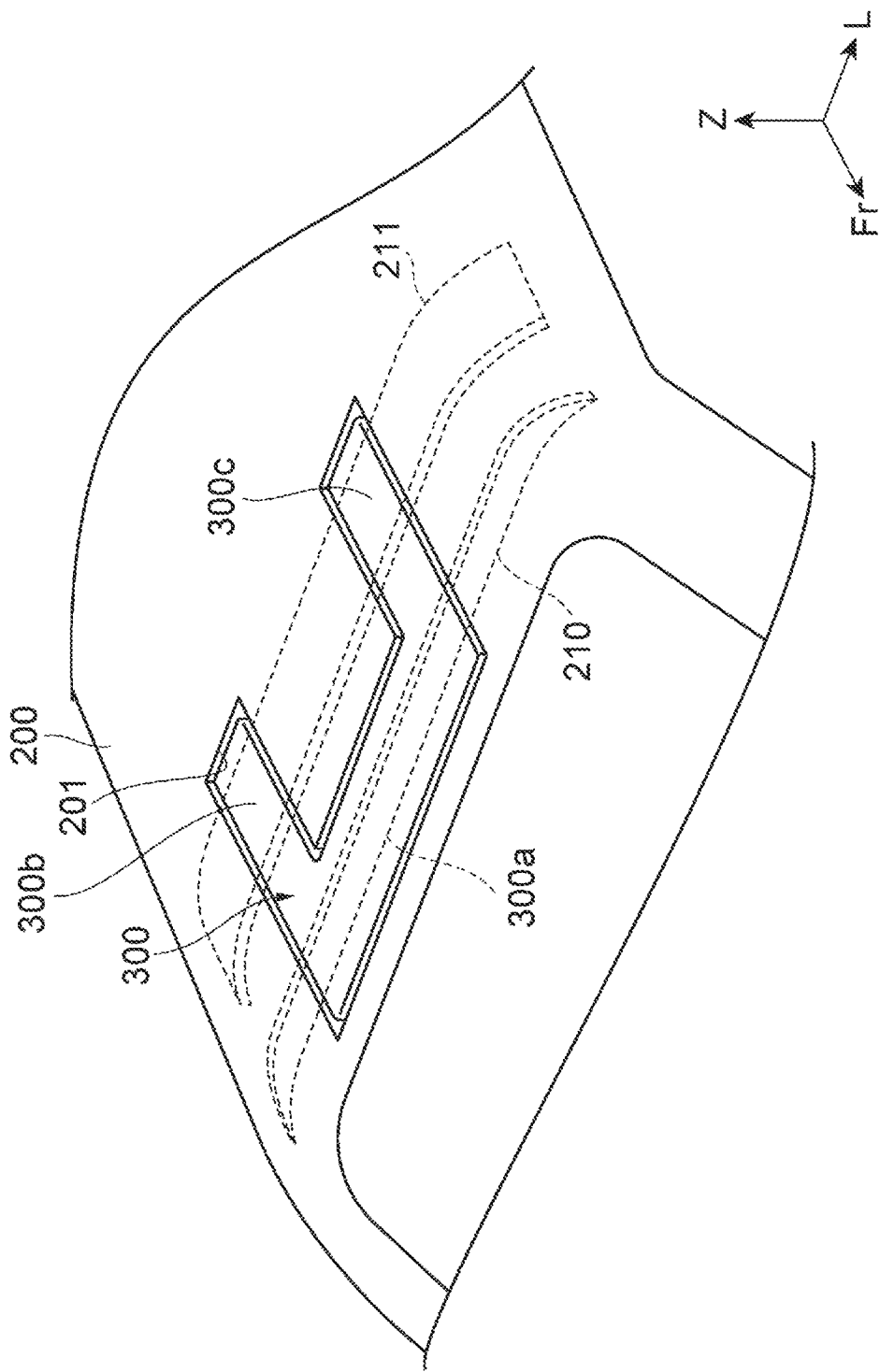
FIG. 9 is a perspective view for illustrating a modification of a vehicle sensor mounting structure.

FIG. 9 is a perspective view for illustrating a modification of the vehicle sensor mounting structure. FIG. 9 shows a vehicle roof 200, a first fitting portion 201, a U-shaped first bracket 300, and roof reinforcements 210 and 211. The first bracket 300 has a front portion 300a, a front right side portion 300b, and a front left side portion 300c.

In the modification shown in FIG. 9, the front portion 300a of the first bracket 300 is provided on the roof reinforcement 210. Further, the front right side portion 300b and the front left side portion 300c of the first bracket 300 are provided so as to extend across the roof reinforcement 211 extending in the vehicle width direction in a plan view.

As described above, in the vehicle sensor mounting structure in the modification, since the front right side portion 300b and the front left side portion 300c of the U-shaped first bracket 300 are provided so as to extend across the roof reinforcement 211 extending in the vehicle width direction in a plan view, as compared with the case where the front right side portion 300b and the front left side portion 300c of the first bracket 300 are provided so as not to extend across the roof reinforcement 211, the rigidity can be increased. The front portion 300a of the first bracket 300 does not need to be provided on the roof reinforcement 210. The modification shown in FIG. 9 can also be applied to the second bracket on the rear side in the vehicle front-rear direction.

Figure 10A:
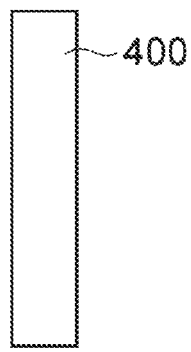
FIG. 10A is a plan view showing a first modification of the first bracket.

Subsequently, modifications of the bracket will be described. Hereinafter, modifications of the first bracket will be described, but the modifications can also be applied to the second bracket. FIG. 10A is a plan view showing a first modification of the first bracket. A first bracket 400 shown in FIG. 10A does not have a U-shape and is provided as an I-shaped member.

For example, only the front sensor group 30 of the first sensor group S1 is installed in the I-shaped first bracket 400. Alternatively, a sensor facing the left of the vehicle may be installed at the left end of the first bracket 400, or a sensor facing the right of the vehicle may be installed at the right end of the first bracket 400. Further, by arranging a plurality of I-shaped first brackets 400 in a U-shape, each of the front sensor group 30, the front right sensor group 40, and the front left sensor group 50 of the first sensor group S1 may be installed.

Thus, in the modification shown in FIG. 10A, since the first bracket 400 (and/or the second bracket) is an I-shaped member, as compared with the case where the bracket shape is complex, the first bracket 400 can be easily mounted on the roof 100. Further, since the I-shaped brackets can be mounted on the front, rear, right and left sides of the roof 100 away from each other, as compared with the U-shaped bracket, the arrangement position can be easily adjusted according to the size of the roof 100 and the shape of the roof 100, which increases the degree of freedom in vehicle design.

Figure 10B:
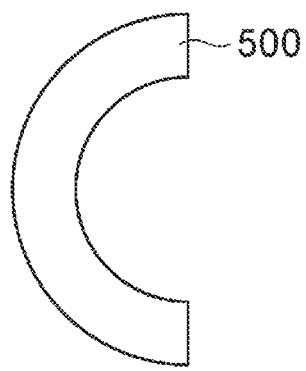
FIG. 10B is a plan view showing a second modification of the first bracket.

FIG. 10B is a plan view showing a second modification of the first bracket. A first bracket 500 shown in FIG. 10B is provided as an arc-shaped member. The angle of the first bracket 500 is not limited as long as the first bracket 500 has an arc-shape, but can be, for example, a semi-arc having an angle of 180°. In such an arc-shaped first bracket 500, the first sensor group S1 is arranged in a curved shape along the arc.

Figure 10C:
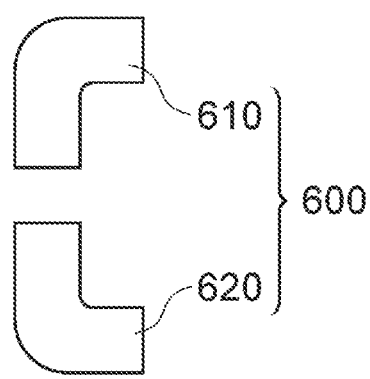
FIG. 10C is a plan view showing a third modification of the first bracket.

FIG. 10C is a plan view showing a third modification of the first bracket. A first bracket 600 shown in FIG. 10C is composed of two L-shaped bracket members 610 and 620. The first bracket 600 is fitted into the roof 100 so as to define a U-shape by arranging the two L-shaped bracket members 610 and 620 side by side.

As described above, the first bracket 600 may be composed of a plurality of members. At this time, the first sensor group S1 is separately installed in the two L-shaped bracket members 610 and 620. The two bracket members 610 and 620 may be equipped with the same combination of sensors, or may be equipped with different combinations of sensors. The modifications shown in FIGS. 10A to 10C described above can also be applied to the second bracket 20.

What is claimed is:

1. A vehicle sensor mounting structure in which multiple sensors configured to detect an external environment are mounted on a roof of a vehicle, the vehicle sensor mounting structure comprising:

a first sensor kit having a first sensor group and a first bracket on an upper surface of which the first sensor group is installed, the first sensor group including a plurality of sensors that is included in the multiple sensors, and the plurality of sensors including at least two kinds of sensors selected from among a camera, a millimeter wave radar, and a Light Detection and Ranging sensor;

a second sensor kit having a second sensor group and a second bracket on an upper surface of which the second sensor group is installed, the second sensor group including a plurality of sensors that is included in the multiple sensors, and the plurality of sensors including at least two kinds of sensors selected from among a camera, a millimeter wave radar, and a Light Detection and Ranging sensor;

a first fitting portion which is provided on a front side of the roof in a vehicle front-rear direction, and into which the first bracket is fitted such that the upper surface is exposed; and a second fitting portion which is provided on a rear side of the roof in the vehicle front-rear direction so as to face the first fitting portion in the vehicle front-rear direction, and into which the second bracket is fitted such that the upper surface is exposed, wherein the first sensor group includes
a front sensor group facing a front side of the vehicle,
a front right sensor group facing a front right side of the vehicle, and
a front left sensor group facing a front left side of the vehicle;

the second sensor group includes
a rear sensor group facing a rear side of the vehicle,
a rear right sensor group facing a rear right side of the vehicle, and
a rear left sensor group facing a rear left side of the vehicle;

the first bracket is a U-shaped member in a plan view having
a front portion which extends in a vehicle width direction on the roof and on which the front sensor group is installed,
a front right side portion which extends from a right end of the front portion toward the rear side of the vehicle and on which the front right sensor group is installed, and
a front left side portion which extends from a left end of the front portion toward the rear side of the vehicle and on which the front left sensor group is installed; and the second bracket is a U-shaped member in the plan view having
a rear portion which extends in the vehicle width direction on the roof and on which the rear sensor group is installed, a rear right side portion which extends from a right end of the rear portion toward the front side of the vehicle and on which the rear right sensor group is installed, and a rear left side portion which extends from a left end of the rear portion toward the front side of the vehicle and on which the rear left sensor group is installed.

2. The vehicle sensor mounting structure according to claim 1, wherein the front right side portion and the front left side portion of the first bracket are provided so as to extend across a roof reinforcement extending in the vehicle width direction in the plan view.

3. A vehicle sensor bracket set for mounting multiple sensors configured to detect an external environment on a roof of a vehicle, the vehicle sensor bracket set comprising:

a first bracket on an upper surface of which a first sensor group is installed, the first sensor group including a plurality of sensors that is included in the multiple sensors, and the plurality of sensors including at least two kinds of sensors selected from among a camera, a millimeter wave radar, and a Light Detection and Ranging sensor; and a second bracket on an upper surface of which a second sensor group is installed, the second sensor group including a plurality of sensors that is included in the multiple sensors, and the plurality of sensors including at least two kinds of sensors selected from among a camera, a millimeter wave radar, and a Light Detection and Ranging sensor, wherein the first bracket is fitted into a first fitting portion provided on a front side of the roof in a vehicle front-rear direction with the upper surface exposed, the second bracket is fitted into a second fitting portion provided on a rear side of the roof in the vehicle front-rear direction with the upper surface exposed so as to face the first bracket in the vehicle front-rear direction the first bracket is a U-shaped member in a plan view having a front portion extending in a vehicle width direction on the roof, a front right side portion extending from a right end of the front portion toward a rear side of the vehicle, and a front left side portion extending from a left end of the front portion toward the rear side of the vehicle; and the second bracket is a U-shaped member in the plan view having a rear portion extending in the vehicle width direction on the roof, a rear right side portion extending from a right end of the rear portion toward a front side of the vehicle, and a rear left side portion extending from a left end of the rear portion toward the front side of the vehicle.

* * * * *